United States Patent
Cho (10) Patent No.: US 7,474,665 B2
(45) Date of Patent: Jan. 6, 2009

(54) APPARATUS AND METHOD FOR COMPULSIVELY RECEIVING MULTI-CALLS OVER INTERNET PROTOCOL PHONES IN INTERNET PROTOCOL TELEPHONY SYSTEM

(75) Inventor: Sung-Kwan Cho, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 923 days.

(21) Appl. No.: 10/376,626

(22) Filed: Mar. 3, 2003

(65) Prior Publication Data

US 2003/0165145 A1 Sep. 4, 2003

(30) Foreign Application Priority Data

Mar. 4, 2002 (KR) ............................ 2002-11291

(51) Int. Cl.
*H04L 12/28* (2006.01)
*H04L 12/66* (2006.01)

(52) U.S. Cl. .................. 370/401; 370/352; 370/395.2

(58) Field of Classification Search ............. 370/352, 370/351, 356, 395.1, 401, 230, 260, 331, 370/337
See application file for complete search history.

(56) References Cited

U.S. PATENT DOCUMENTS

| | | | | |
|---|---|---|---|---|
| 5,999,525 A * | 12/1999 | Krishnaswamy et al. | ..... | 370/352 |
| 6,363,065 B1 * | 3/2002 | Thornton et al. | ............ | 370/352 |
| 6,473,411 B1 * | 10/2002 | Kumaki et al. | ............... | 370/331 |
| 6,522,635 B1 * | 2/2003 | Bedwell | ...................... | 370/314 |
| 6,625,119 B1 * | 9/2003 | Schuster et al. | ............ | 370/230 |
| 6,711,166 B1 * | 3/2004 | Amir et al. | ................ | 370/395.1 |
| 6,769,020 B2 * | 7/2004 | Miyazaki et al. | ............ | 709/219 |
| 6,792,264 B1 * | 9/2004 | Iseyama et al. | ........... | 455/414.1 |
| 6,928,067 B1 * | 8/2005 | Hameleers et al. | .......... | 370/352 |
| 6,934,282 B1 * | 8/2005 | Yoon | ........................... | 370/356 |
| 6,961,332 B1 * | 11/2005 | Li et al. | ...................... | 370/352 |
| 6,980,526 B2 * | 12/2005 | Jang et al. | ................... | 370/260 |
| 2001/0036167 A1 * | 11/2001 | Menon et al. | ............... | 370/337 |

(Continued)

FOREIGN PATENT DOCUMENTS

EP 102980903 4/2003

(Continued)

OTHER PUBLICATIONS

"The Voice Over Internet Protocol (VoIP)" article written by Bur Goode, in IEEE, vol. 90, No. 9, pp. 1495-1517 issued in Sep. 2002.

(Continued)

*Primary Examiner*—Alpus H Hsu
*Assistant Examiner*—Kan Yuen
(74) *Attorney, Agent, or Firm*—Robert E. Bushnell, Esq.

(57) ABSTRACT

Multi-call method and apparatus between IP terminals in internet telephony system are disclosed. For this, the multi-call method and apparatus request compulsive reception multi-calls to destination IP terminals using IP addresses, provided from a gatekeeper, corresponding to each virtual address of the destination IP terminals belonging to a specific group when the specific group for the compulsive reception multi-calls is designated by a user. They also perform the compulsive reception multi-calls using call connect message transmitted from the destination IP terminals automatically.

17 Claims, 6 Drawing Sheets

U.S. PATENT DOCUMENTS

| | | |
|---|---|---|
| 2002/0086665 A1 | 7/2002 | Maggenti et al. |
| 2002/0089939 A1 | 7/2002 | Foti |
| 2002/0126656 A1 | 9/2002 | Park |
| 2002/0141357 A1 | 10/2002 | Park et al. |
| 2002/0196781 A1* | 12/2002 | Salovuori .................. 370/352 |
| 2003/0031166 A1* | 2/2003 | Saller ........................ 370/352 |
| 2005/0027985 A1* | 2/2005 | Sprunk et al. .............. 713/171 |
| 2006/0069726 A1* | 3/2006 | McKibben et al. .......... 370/260 |

FOREIGN PATENT DOCUMENTS

| | | |
|---|---|---|
| JP | 2001-177577 | 6/2001 |
| WO | WO 02/51072 A1 | 6/2002 |
| WO | WO03005689 | 1/2003 |

OTHER PUBLICATIONS

"*Search Report under Section 17*" dated on Jun. 30, 2003 issued by U.K. Patent Office.

* cited by examiner

APPARATUS AND METHOD FOR COMPULSIVELY RECEIVING MULTI-CALLS OVER INTERNET PROTOCOL PHONES IN INTERNET PROTOCOL TELEPHONY SYSTEM

CLAIM OF PRIORITY

This application claims priority under 35 U.S.C. § 119 to my application entitled "Apparatus and method for compulsively receiving multi-calls over internet protocol phones in internet protocol telephony system" filed in the Korean Industrial Property Office on Mar. 4, 2002 and assigned Serial No. 02-11291, the contents of which are hereby incorporated by reference.

BACKGROUND OF THE INVENTION

1. Field of the Invention

The present invention relates generally to an internet protocol telephony system, and in particular, to an apparatus and method for compulsively (i.e., irregardless of whether or not the destination party responds) receiving multi-calls (or group calls) between IP terminals in internet protocol telephony system.

2. Description of the Related Art

According to recent rapid spread of and diverse service requirements to the internet, an IP(Internet Protocol)-based network or packet-based network (hereinafter totally called "IP network") is being brilliantly developed in not only an aspect of performance but also an aspect of service. For example, although the IP network is typically realized in consideration of data transfer, it is also required to transfer voice. According to this kind of requirement, the IP network is extended to make multimedia services possible. That is, it is possible to transfer video and data as well as voice like the conventional communication network through the IP network. In an aspect that voice call between subscribers is possible by transferring voice, the IP network is called "VoIP" (Voice over IP) system or "Internet Protocol Telephony System". As described above, the voice transfer with data through the IP network now plays a key role in the IP network. Under these circumstances, various research on transferring voice via the IP network are undertaken.

For example, H.323 standards, communication specifications on multimedia of ITU-T(International Telecommunication Union-Telecommunication) provide a frame for voice, video and data communication through the IP network including the internet. One of H.323 entities defined in the H.323 protocols is a gatekeeper. The gatekeeper is to bind H.323 endpoints existing in the IP network to a control domain defined as "zone" and to control, manage and incorporate them. For example, the H.323 endpoints include gateways, terminals and MCUs(Multi-point Control Units), etc. The zone is composed of one gatekeeper and one H.323 endpoint or more. Plural gatekeepers can compose multi-zones and another gatekeeper can exist to control the multi-zones.

There are major functions of gatekeeper such as address translation, call admission, bandwidth control, call control and maintenance, etc. The address translation function means to translate an virtual name or a destination number to a network address, namely an IP address. The call admission function means a function of RAS(Registration/Admission/Status), totally named for protocols relating to gatekeepers in H.323. The bandwidth control function means to allot bandwidth, which is a limited resource of network, to each endpoint, check if the allotted bandwidth reaches a limit value and block over-limit value. The call control function means to connect/cancel calls among endpoints via the gatekeeper as an intermediate device. The maintenance function means an additive function such as charge or statistics, etc.

The RAS is a basic signaling protocol of the gatekeeper. The RAS is a protocol of realizing a basic interface between a gatekeeper and endpoints such as phones, gateways and MCUs, etc. The gatekeeper corresponds to a server and the endpoints do to clients in the RAS. Namely, the RAS is an essential and fundamental protocol through which the gatekeeper as the server operates and controls endpoints as clients. The gatekeeper also checks status of the endpoints through the RAS to reflect the results on controlling them. In the RAS, the registration is that each endpoint as the client registers itself to the gatekeeper as the server. The admission is that the gatekeeper checks if the clients satisfy rules of the H.323 and corresponding zone to admit an access to the VoIP network. Here, the access to the VoIP network means initial setup of a VoIP call. The H.323 rules are to check if virtual names and registration IDs(Identifications) of each endpoint are overlapped with the ones of the other endpoints. The zone rules are to check if the corresponding endpoints are registered to the gatekeeper. The status is to report current situation and information on each endpoint to the gatekeeper periodically. Therefore, the gatekeeper can obtain information, which is necessary to operate and control the endpoints, and test links between the server and the clients periodically.

As described above, the IP-phones and the gatekeeper are interfaced according to the RAS, which is the H.323 protocol of ITU-T specifications. According to the conventional VoIP system or IP telephony system, there provides a multi-point controller (hereinafter called "MC"). However, there occurs inconvenience in operation of it as follows.

First, the MC function is to invite the next IP terminal, connect and perform the next call after one-to-one call. That is, the conventional MC function has purpose to realize multi-calls, not one-to-many calls. Accordingly, a function of making calls to plural destination IP terminals and talking to them at the same time cannot be provided through the MC function.

Second, a call becomes set up when a destination IP terminal responds to the call in the MC function. Therefore, a call cannot be made in case that a destination IP terminal does not respond. Accordingly, there is a problem that cannot accomplish the fundamental purpose of information share or rapid information transfer, if a call would be not set up when someone tries to make an urgent call.

Third, although an effective multi-calls can be realized by using the MC function, it is difficult to design message flow of them and manage them. It is also difficult to make one-to-many calls by a single call request.

SUMMARY OF THE INVENTION

It is therefore an object of the present invention to provide an apparatus and method for receiving multi-calls (or group call) conpusively between IP terminals in internet protocol telephony system, which performs multi-calls utilized more conveniently between terminals in a voice-data integrate system.

It is another object of the present invention to provide an apparatus and method for compulsively receiving multi-calls between IP terminals in internet protocol telephony system, which removes inconvenience of waiting responses of destination terminals in time of multi-calls between terminals in the voice-data integrate system.

It is yet another object of the present invention to provide an apparatus and method for compulsively receiving multi-calls between IP terminals in internet protocol telephony system, which sets up calls rapidly in time of multi-calls between terminals in the voice-data integrate system.

It is further another object of the present invention to provide an apparatus and method for compulsively receiving multi-calls between IP terminals in internet protocol telephony system, which simplifies call signaling process in time of multi-calls between terminals in the voice-data integrate system.

It is further another object of the present invention to provide an apparatus and method for setting up calls without any destination user's manipulation in time of multi-calls between terminals in the voice-data integrate system.

To achieve these and other objects, there is provided a method for compulsively receiving multi-calls between IP terminals in internet protocol telephony system comprising a plurality of IP terminals and a gatekeeper for managing IP addresses corresponding to each virtual address of the plurality of IP terminals, the method including querying IP addresses corresponding to each virtual address of destination IP terminals included in a specific group among the plurality of IP terminals when the specific group for compulsive reception multi-calls is designated by a user, allocating channels connected to the destination IP terminals corresponding to each IP address, which are provided from the gatekeeper and transmitting compulsive setup messages through each allocated channel and performing the compulsive reception multi-calls when receiving call connect messages transmitted automatically from the destination IP terminals in response to the compulsive setup message.

In another aspect of the present invention, there is provided a method for compulsively receiving multi-calls between IP terminals in internet protocol telephony system comprising a plurality of IP terminals and a gatekeeper, which manages IP addresses corresponding to each virtual address of a plurality of IP terminals, the method including being input a group number with a specific code requesting compulsive reception multi-calls from a user, resetting values of call result fields in a management table, where the call result fields correspond to each destination IP terminal belonging to a specific group of the group number, performing call signaling with the gatekeeper with respect to the destination IP terminals and acquiring the IP addresses corresponding to the virtual addresses of the destination IP terminals through the call signaling, allocating channels that are not in use corresponding to each destination IP terminal and recording the virtual addresses of the destination IP terminals into virtual address fields in the channel usage status table with respect to each allocated channel, transmitting compulsive setup message through each allocated channel, recording information indicating successful call setup into setup result fields of the management table, and recording information indicating in-use into channel status fields of the channel usage status table, when call connect message is received automatically from each destination IP terminal in response to the compulsive setup message, and performing the compulsive reception multi-calls with the destination IP terminals.

In yet another aspect of the present invention, there is provided an apparatus of compulsively receiving multi-calls between IP terminals in internet protocol telephony system, the apparatus comprises a gatekeeper for managing IP addresses corresponding to virtual addresses of the IP terminals; a source IP terminal for acquiring IP addresses corresponding to each virtual address of destination IP terminals, belonging to a specific group, from the gatekeeper to transmit compulsive setup message when the specific group is designated by the user for the compulsive reception multi-calls, and performing the compulsive reception multi-calls using call connect messages received from the destination IP terminals, and destination IP terminals for transmitting the call connect messages to the source IP terminal automatically to perform the compulsive reception multi-calls when the compulsive setup message is received from the source IP terminal.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Before the embodiments of the present invention are described in detail, the terms used below are defined in the following Table 1:

TABLE 1

G/K: Gatekeeper
IP: Internet Protocol
TFTP: Trivial File Transfer Protocol
DHCP: Dynamic Host Configuration Protocol
AAA: Authentication, Authorization and Account
RRQ: Registration Request
RCF: Registration Confirmation
RAS: Registration/Admission/Status
(Registration and Admission Control Signaling)
URQ: Unregistration Request
UCF: Unregistration Confirm Meanwhile, in the present descriptions below, calls made from one terminal to many terminals are called multi-calls. In multi-calls, compulsive reception means that voice communication is possible without destination's response. Typically network connecting scheme for realizing the VoIP is divided into 3 categories and they are as follows:

The first one is to connect one source IP terminal with a destination IP terminal. A representative scheme of this is a multimedia call using net meeting. In this case, since each source IP terminal has to send H.323 message directly to a selected destination IP terminal, an IP address of the corresponding destination IP terminal should be known. Also, a destination IP terminal should be in standby status in order to receive the message and be available for mutual communication. Accordingly, destination IP terminal's information including an IP address should be known.

The second one is to connect an IP terminal and a gateway. If the IP terminal requests connection through the gateway, the gateway connects it with an available one, namely one not in use. The IP terminal requesting connection does not have to know about the IP terminals belonging to the gateway, but only have to know the information on the gateway. The gateway, however, does not have a function that allows connection requested by the source IP terminal, so that the gateway cannot manage the request for connection. This connection scheme is used mainly to the VoIP service accommodating small capacity lines, or to a service of no limits on users.

The third one is to connect an IP terminal and a gatekeeper. The IP terminal requesting connection firstly has to send Registration Request with information on itself to the gatekeeper and be identified in order to be allowed the connection. If the gatekeeper refuses the connection requested by the IP terminal, the connection to the destination IP terminal is not possible. Since this connection scheme allows the gatekeeper to decide whether to connect, it is relatively easy to manage the users. Accordingly, in case of accommodating large capacity lines, the gatekeeper can manage a plurality of IP terminals and gateways. Therefore, the gatekeeper can connect the IP terminal to a proper gateway according to network loads.

Figure 1:
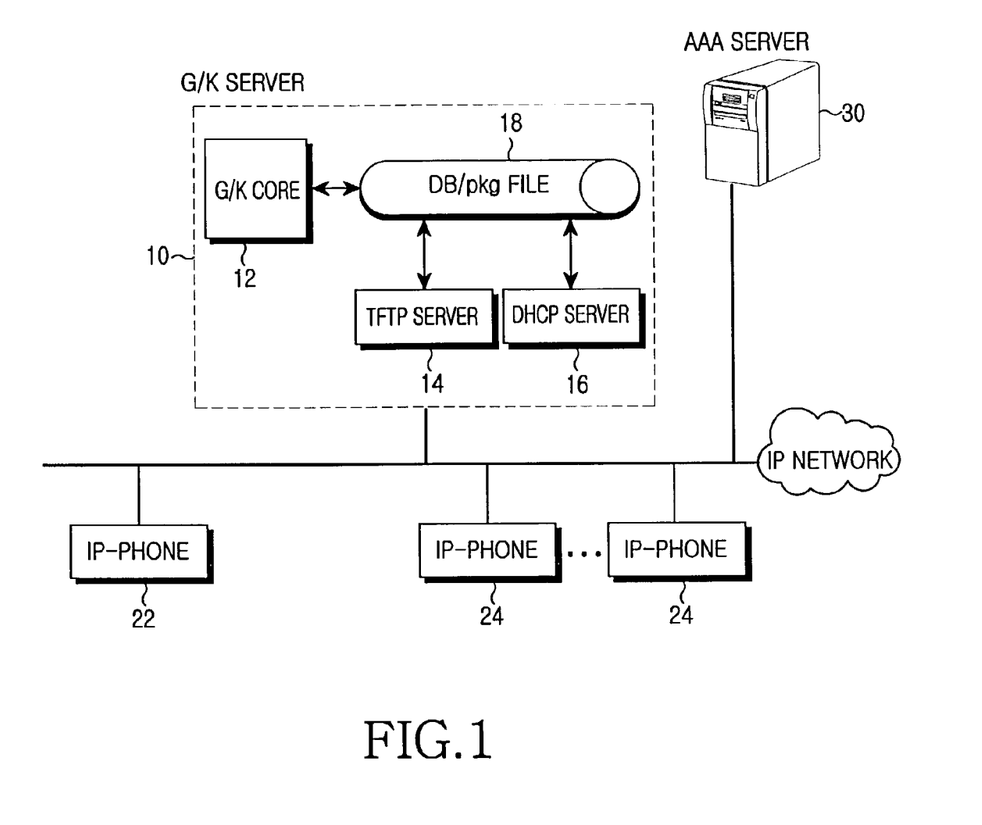
FIG. 1 is an outlined configuration of the internet telephony system according to the principles of the present invention.

Turning to FIG. 1, FIG. 1 is an outlined configuration of the internet protocol (IP) telephony system to which the present invention is applied. The configuration of the IP telephony system is one of the so-called "VoIP systems", which makes it possible to transfer voice through the IP network. Although the VoIP system, as well known, comprises a plurality of gatekeepers, it should be noted that the VoIP system is comprised of gatekeepers located in a certain service zone and the IP terminals are connected to the gatekeepers in the present embodiment.

In FIG. 1, the IP telephony system comprises a gatekeeper (G/K) 10, a plurality of IP terminals 22,24, a Authentication, Authorization and Account (AAA) server 30. These elements are connected to the IP network. The G/K 10 includes a gatekeeper core 12, a Trivial File Transfer Protocol (TFTP) server 14, a Dynamic Host Configuration Protocol (DHCP) server 16 and a storage portion 18. The IP terminals 22, 24 are connected to the gatekeeper 10 for voice call service through the IP network or call service among the IP terminals. The call service among the IP terminals includes 1:n multi-call (or group call) service as well as 1:1 call service. The multi-call or group call service means that any source IP terminal is connected to a plurality of destination IP terminals managed by the gatekeeper 10. The IP terminals 22, 24 are connected to the DHCP server 16 of the gatekeeper 10 to be allocated their IP addresses and TFTP server IP addresses. Then they are connected to the TFTP server 14 to be allocated their phone numbers, namely subscriber's information of H. 323 IDs and gatekeeper IP addresses. The subscribe's information of phone number can adopt various terms according to the protocol, and the phone number is used as a virtual address, Virtual_Address #. Alternatively, the IP terminals 22,24 are provided the destination IP terminals' IP addresses from the gatekeeper 10 using the destination IP terminals' phone numbers, H.323 IDs, if they want to perform multi-calls. Subsequently, the source IP terminals 22,24 transmit compulsive setup message to the destination IP terminals corresponding to the IP addresses provided by the gatekeeper 10. Meanwhile, the source IP terminals 22, 24 transmit connection message automatically to the destination IP terminals without destination IP terminal's confirmation when they receive the compulsive setup message. Therefore, any source IP terminal becomes connected to the destination IP terminals compulsively when it generates compulsive reception message according to multi-calls. In other words, the call or multi call is received irregardless of whether or not the destination party or parties respond. The gatekeeper core 12 controls actions undertaken by the gatekeeper 10 generally. The storage portion 18 comprises a database in order to store information on the source IP terminals, which request registration. The storage portion 18 also stores package files to the database. The package files are downloaded from the AAA server 30 and stored by the gatekeeper 10 with the subscriber's information of the source IP terminal. At this time, the subscriber's information includes phone numbers of H.323 IDs and IP addresses, stored in the DB. When a function of the DHCP server 16 is used, the IP addresses are not necessary. The DHCP server 16 allocates the IP addresses and the TFTP server's IP addresses to the destination IP terminals. The TFTP server 14 allocates subscriber's information as phone numbers of H.323 IDs and gatekeeper's IP addresses to the destination IP terminals. The TFTP server 14 stores IP addresses corresponding to the source IP terminals of H.323 IDs to the storage portion 18 in response to that information on subscribers who want to call, namely phone numbers of H.323 IDs, is provided by the source IP terminals. The elements of the gatekeeper 10 including the gatekeeper core 12, the TFTP server 14, the DHCP server 16 and the storage portion 18 are interconnected each other in order to make inter-processor communication possible. The AAA server 30 authenticates the IP terminals 22, 24 in order for them to be connected to the IP network and accounts them for their connection.

Figure 2:
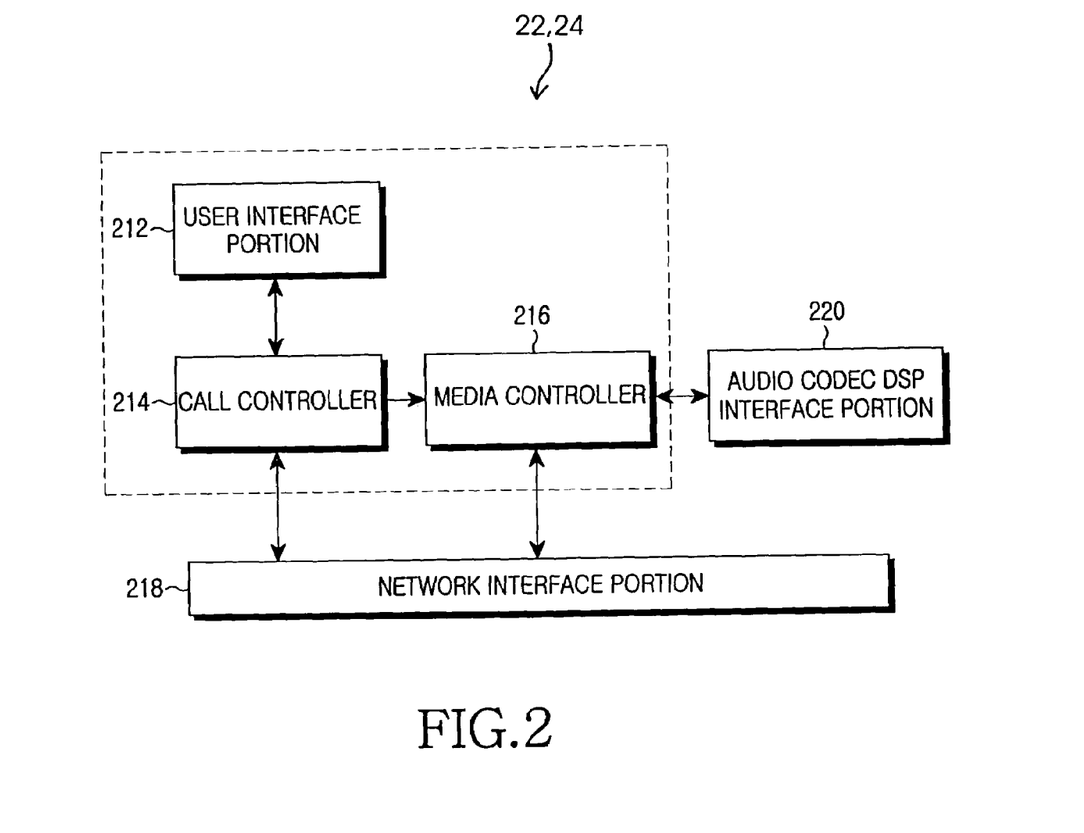
FIG. 2 is an outlined configuration of the source IP terminal according to the principles of the present invention.

FIG. 2 is an outlined configuration of the IP terminal 22, 24 to which the present invention is applied. Referring to the FIG. 2, the user interface portion 212 interfaces data input by a user via a keypad, etc., with a call controller 214 or information from the call controller 214 with a displaying device, which informs it to the user. The call controller 214 performs signaling for initial action due to connection to the gatekeeper 10 according to the RAS protocol and call signaling according to call request from the user through the user interface portion 212. The call signalings include one with the gatekeeper 10 and the other one with the IP terminals. In particular, the call controller 214 transmits compulsive reception message for the compulsive reception multi-calls according to the present invention to the IP terminals.

In addition, the call controller 214 manages call setup status according to the compulsive reception multi-calls and information on the proceeding status. A media controller 216 processes voice data transmitted and received when the multi-calls are set up after completion of the call signaling. That is, it provides voice data received via a network interface portion 218 from the multi-calls-set up IP terminals to an audio codec digital signal processing interface portion 220.

Meanwhile, it transmits voice data provided from the audio codec digital signal processing interface portion 220 to all of the multi-calls-set up IP terminals through the network interface portion 218. The audio codec digital signal processing interface portion 220 compresses user's voice, processes signals digitally and outputs them to a media controller 216. Then it transforms voice data provided from the media controller 216 into audible sounds and provides them to the user. The network interface portion 218 transfers signals output from the call controller 214 and the media controller 216 to the network or provides signals received from the network to the call controller 214 or the media controller 216.

As described above, the IP terminals 22, 24 are connected to the gatekeeper 10 to be initialized and then their, "registration" "authentication" and "status" actions are performed according to the RAS protocol. For the reference, the IP terminals 22, 24 are initialized according to the RAS protocol of H.323 standards by the users' input of initialization information. Subsequently, for the multi-calls according to an embodiment of the present invention, when the IP addresses of the destination IP terminals requesting multi-calls are requested by a source IP terminal, the gatekeeper 10 provides them to the source IP terminal. The source IP terminal performs multi-calls, which request compulsive reception, using the IP addresses provided by the gatekeeper 10.

If the compulsive reception multi-calls are achieved by the source IP terminal, there may be generated inconsistent portions between the source IP terminal and destination IP terminals. These inconsistent portions can be resolved by performing actions according to signal flow as shown in FIGS. 3 to 6. Herein below, the IP terminal 22 is supposed to be a source IP terminal, and the IP terminals 24 are supposed to be a destination IP terminals. It should be also notable that source IP terminals, though not shown in the figures, also perform the same compulsive reception multi-calls as the ones between the IP terminals 22 and 24.

Figure 3:
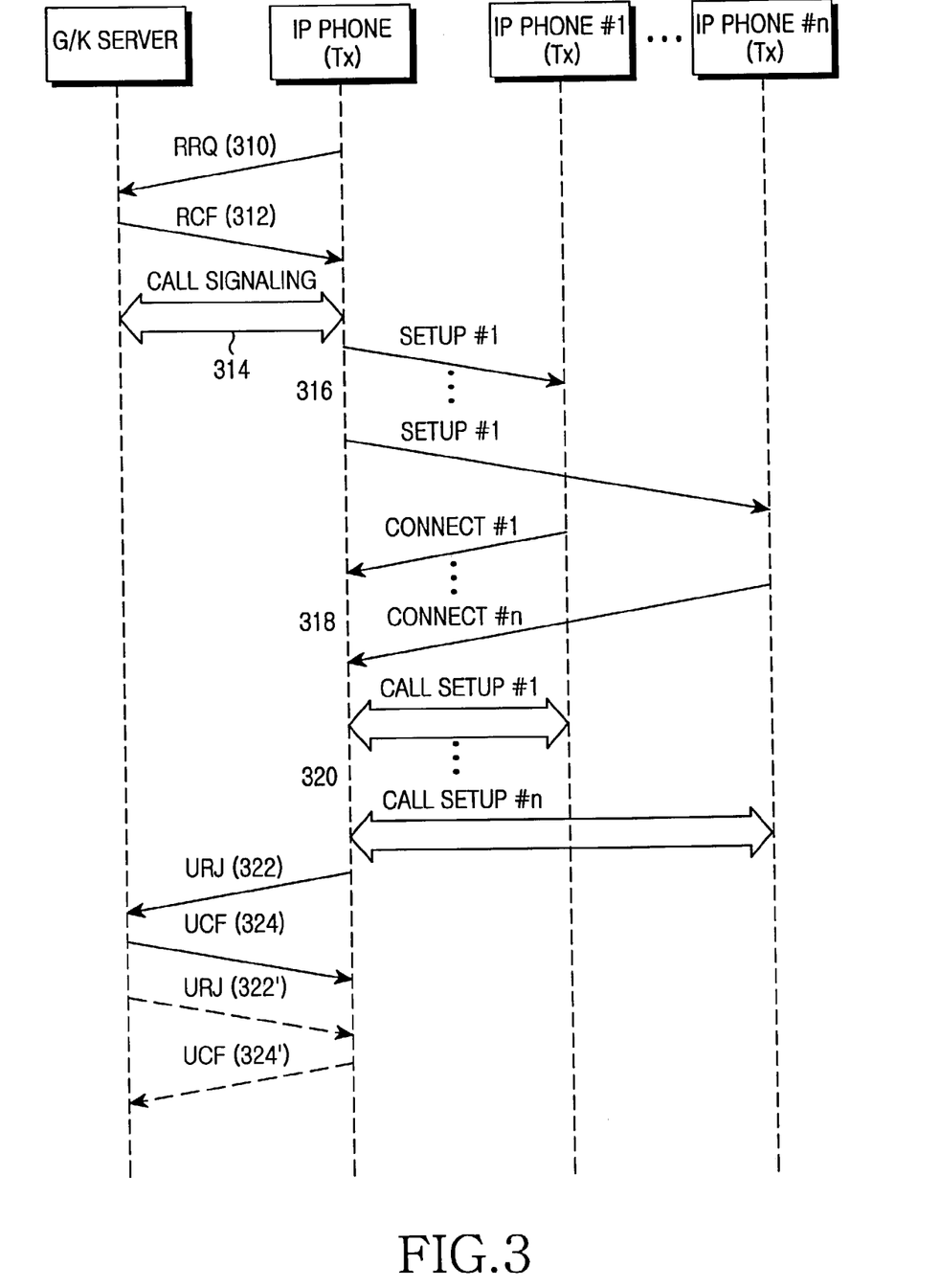
FIG. 3 shows signal flow between elements of the internet telephony system according to compulsive reception multi-calls according to an embodiment of the present invention.

FIG. 3 shows signal flow between each element for realizing the compulsive reception in the internet protocol telephony system according to an embodiment of the present invention.

Referring to the FIG. 3, the IP terminal 22 is connected to the gatekeeper 10, and then transmits RRQ message to request registration at step 310. Requesting registration, the IP terminal 22 uses H.323 ID and IP address allocated to itself In response to the request, the gatekeeper 10 transmits Registration Confirmation (RCF) message to the IP terminal 22 at step 312. The gatekeeper 10 stores information on the IP terminal 22, namely the H.323 ID and IP address, to the DB in the storage portion 18. By informing this to the AAA server 30, it maintains synchronization between the gatekeeper 10 and the AAA server 30 with respect to the subscriber information on the IP terminal 22. According to the above-described initialization process, the IP terminal 22 completes its registration to the gatekeeper 10.

Meanwhile, the IP terminal 22 performs the call signaling with the gatekeeper 10 in order to acquire the IP addresses of the destination IP terminals that become destinations of the compulsive reception multi-calls, if it receives requests of the compulsive reception multi-calls from a user. That is, the IP terminal 22 is provided the IP addresses corresponding to the virtual addresses from the gatekeeper 10 by transmitting the virtual addresses corresponding to the destination IP terminals to the gatekeeper 10. The IP terminal 22 transmits compulsive setup message requesting the compulsive reception multi-calls at step 316 to the destination IP terminals corresponding to each allocated IP address. The destination IP terminals transmit call connect message to the source IP terminal in response to the compulsive setup message at step 318. Typically, the call connect message is transmitted in case that a destination IP terminal responds to the destination call. However, in case of the compulsive destination multi-calls disclosed by the present invention, the call connect message can be transmitted without any other responding process undertaken by the subscribers of the destination IP terminals by inserting information of the compulsive reception into the compulsive setup message. If the call connect message is provided to the source IP terminal, typical call setup process is performed for calls between the source IP terminal and destination IP terminals (step 320). After calls are set up by the call setup process, the source IP terminal and destination IP terminals perform multi-calls. Meanwhile, although they are not shown in the FIG. 3, the multi-calls can be terminated by call termination of any one of the source IP terminal and destination IP terminals.

If the IP terminal terminates its compulsive reception multi-calls, it may transmit URQ message requesting call cancellation to the gatekeeper 10 at step 322 in order to cancel resources, which are used for the compulsive reception multi-calls. However, the IP terminal generally does not transmit the message. The gatekeeper 10 receiving the URQ message from the IP terminal cancels the resources used by the IP terminal and then transmits UCF message for response to the IP terminal. On the contrary, the resources used in the IP terminals maybe retrieved by the gatekeeper 10. In this case, the gatekeeper 10 transmits the URQ message for requesting resource cancellation to the IP terminal at step 322 and cancels the corresponding resources by transmitting the UCF message to the gatekeeper 10 in response to the URQ message at step 324.

As described above, the compulsive reception multi-calls according to an embodiment of the present invention comprise confirmation process that the source IP terminal confirms the IP addresses corresponding to a specific group, namely the destination IP terminals trying to set up the compulsive reception multi-calls and requesting process that it requests the compulsive reception multi-calls through the confirmed IP addresses. The destination IP terminals set up calls automatically when they are requested to do so by the source IP terminal.

Actions according to an embodiment of the present invention are described in detail below with reference to control flow shown in FIG. 4a, FIG. 4b and FIG. 5. Each action of the source IP terminal, gatekeeper and destination IP terminal is described below in detail.

Actions of the destination IP terminals according to an embodiment of the present invention are described with reference to control flow shown in the FIG. 4.

Figure 4A:
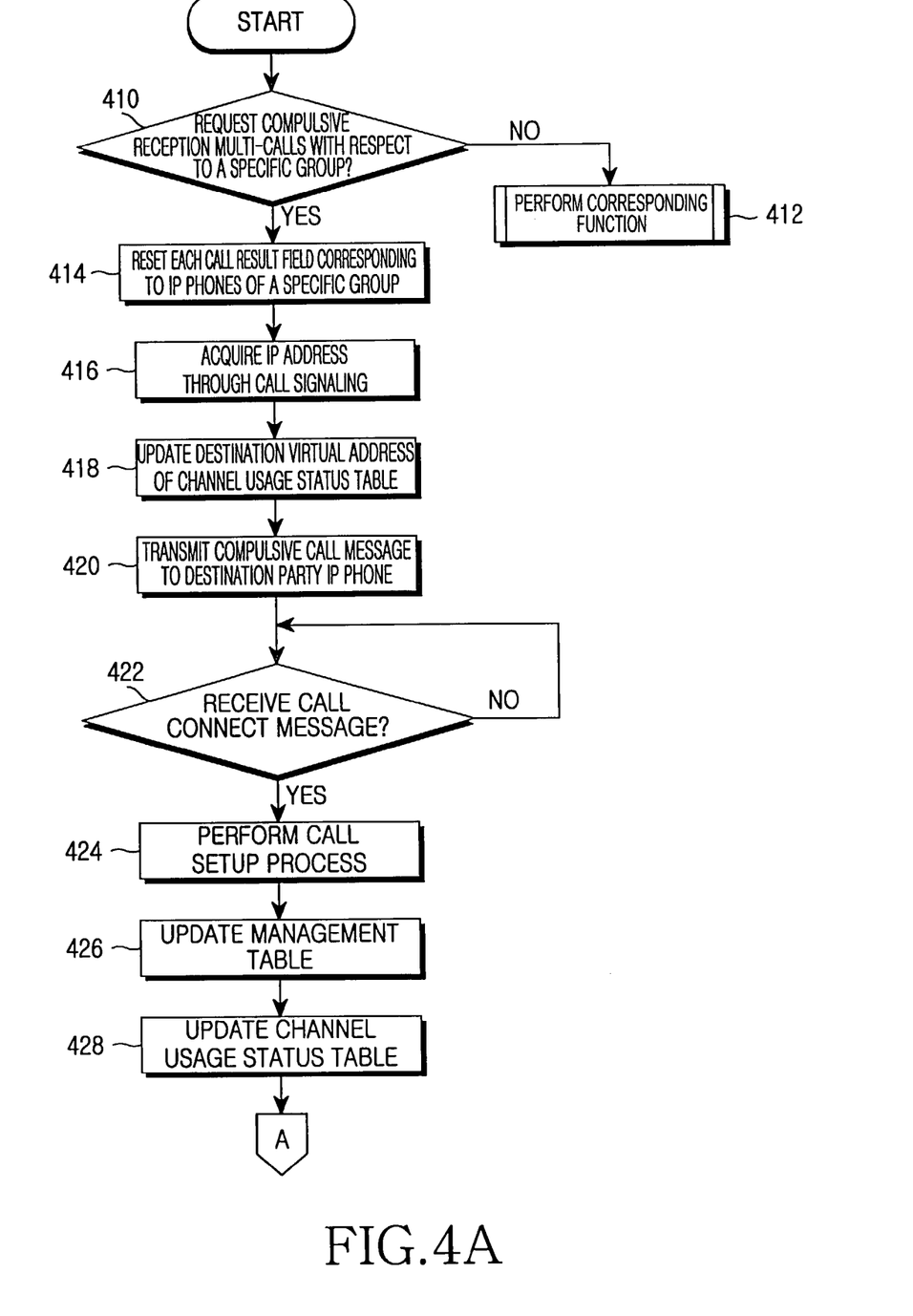
FIGS. 4a and 4b shows control flows of a source IP terminal for compulsive reception multi-calls according to an embodiment of the present invention.
Figure 4B:
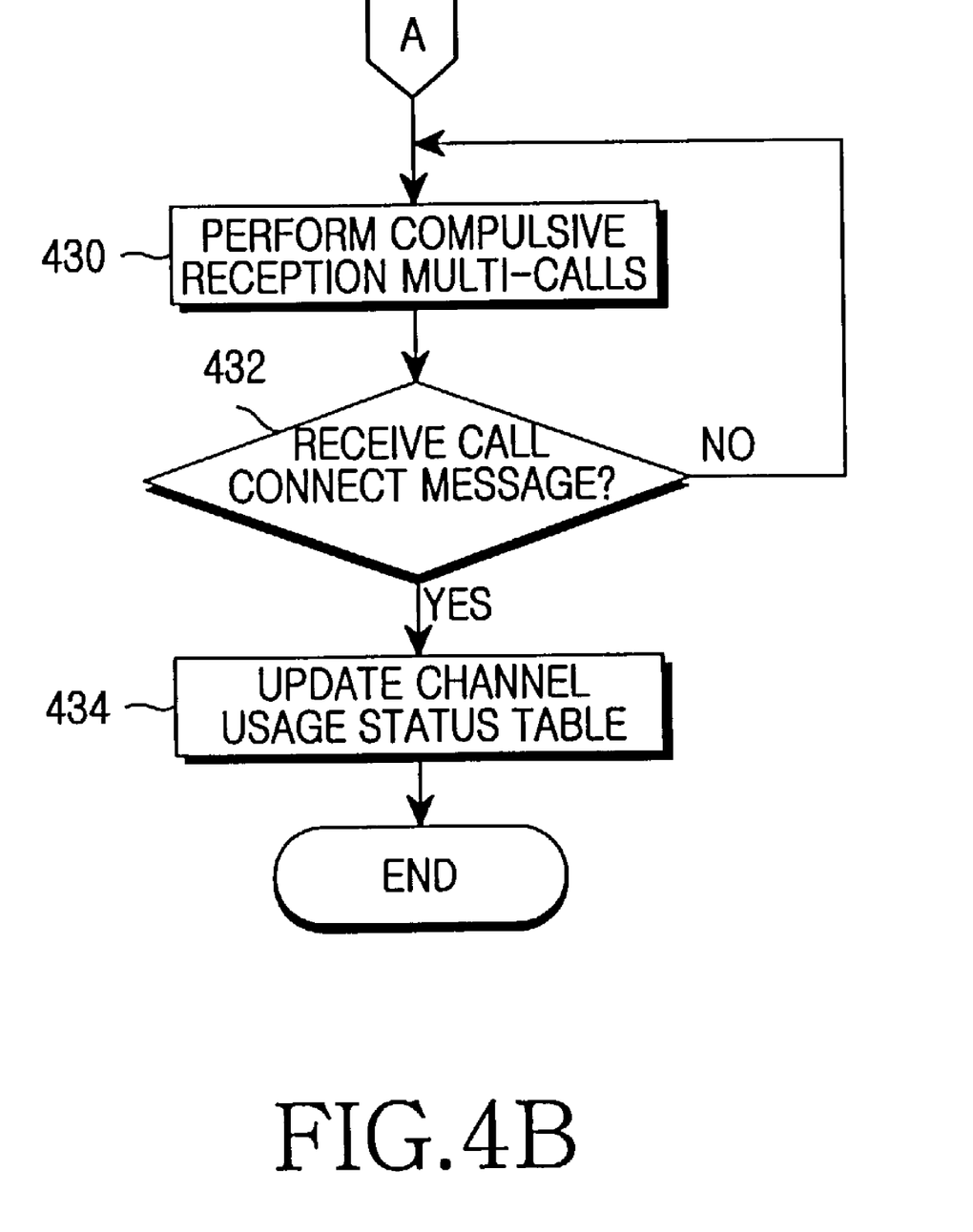

Referring to the FIGS. 4a and 4b, the destination IP terminals 24 check if key data requesting the compulsive reception multi-calls from the user are input through the user interface portion 212 at step 410. The key data may be comprised of "a specific code key +group number". Keys, not used as telephone numbers such as "#","*", etc., in the keypad maybe used as the specific code key. The group number means numbers designating a group of the destination IP terminals, defined for the multi-calls. Accordingly, the source IP terminal 22 can decide the compulsive reception multi-calls by confirming that first key data are the specific code keys through the user interface portion 212. The source IP terminal proceeds to step 412 and performs corresponding function when it decides the call request is a common call request, not the compulsive reception multi-calls at step 410.

In step 410, if it decides the compulsive reception multi-calls are requested by the user, the group number is transferred from the user interface portion 212 to the call controller 214. The call controller 214 comprises a group table internally, and resets each call result field of the destination IP terminals, registered in the group table in response to the group number. The group table comprises fields of the virtual addresses of the IP destination terminals corresponding to the specific group number and fields for recording call results according to the compulsive reception multi-calls. The following table 2 shows an example of the group table.

TABLE 2

| Group number | Virtual address | Call result |
|---|---|---|
| Group #1 | Virtual_Address #1(1) | 0 |
|  | Virtual_Address #1(2) | 0 |
|  | ⋮ | ⋮ |
|  | Virtual_Address #1(n) | 0 |
| ⋮ | ⋮ | ⋮ |
| Group #N | Virtual_Address #N(1) | 0 |
|  | Virtual_Address #N(2) | 0 |
|  | ⋮ | ⋮ |
|  | Virtual_Address #N(n) | 0 |

In table 2, N groups are designated for the compulsive reception multi-calls and each group is comprised of n IP terminals. Also, the virtual address indicating the destination IP terminals composing each group use Virtual-Address. The virtual addresses can be e.164, H.323 IDs or IP addresses according to the protocol. As shown in table 2, call results corresponding to all of the virtual addresses are reset to "0" (step 414). Storing the virtual addresses of the destination IP terminals corresponding to each group shown in the group table is evident to the conventional data management art, so that their detailed description is abbreviated.

The call controller 214 proceeds to step 416 to perform call signaling with the gatekeeper 10 using each virtual address corresponding to the destination IP terminals. That is, the call controller 214 acquires IP addresses of the destination IP terminals by querying each IP address corresponding to the virtual addresses to the gatekeeper 10 through the call signaling. If the virtual addresses are the IP addresses managed by a management table, the source IP may skip the process of acquiring IP addresses through the call signaling with the gatekeeper. The call signaling follows standard protocols defined in H.323. When the call controller 214 acquires the IP addresses, it proceeds to step 418 to allocate channel numbers to each destination IP terminal and updates field values of channel usage status table corresponding to the allocated channel numbers. At this time, the channel numbers may be allocated as those that are not in use. The channel numbers can be indices, which designate channels that can be available in the internet telephony system. The channels may be interpreted as ones for calls between the IP terminals. The channel usage status table is to manage usage status of all of the channels that are available to the internet telephony system. One of the example is shown in the following table 3.

TABLE 3

| Channel number | Channel status | Virtual address (destination) |
|---|---|---|
| 1 | 1 | Virtual_Address #1(1) |
| 2 | 0 |  |
| 3 | 1 | Virtual_Address #N(2) |
| ⋮ | ⋮ | ⋮ |
| N | 0 |  |

As shown in table 3, the channel number "1" is used for an IP terminal, which takes "Virtual_Address #1(1)" as its virtual address, and the channel number "3" is used for the other IP terminal, which takes "Virtual_Address #N(2)" as its virtual address. Accordingly, the channel status corresponding to the above channels in use is set "open", namely "1". Regarding any other channels which are not in use, their channel status is set "close", namely "0". Referring to table 3, the source IP terminal 22 allocates each channel number whose channel status is set to "0" with respect to each destination IP terminal. It also replaces the virtual addresses corresponding to the allocated channel numbers into the ones of the destination IP terminals that allocate corresponding channel numbers. The call signaling follows the standard protocol defined in the H.323.

When the channels to be used are determined according to the above-described, the source IP terminal 22 transmits the compulsive setup message requesting the compulsive reception multi-calls to the destination IP terminals at step 420. At this time, the compulsive setup message includes an auto_call indicating the compulsive reception multi_call request. For example, the compulsive setup message can use setup message proposed in H.225.0. The auto_call can be transmitted with being recorded in H.323 ID field of source address structure, one of UUIE fields of the setup message. Also, the compulsive setup message is transmitted in response to the acquired IP addresses through each allocated channel at step 418. The compulsive setup message is generated by the call controller 214 and transmitted through the network interface portion 218.

Each destination IP terminal having received the compulsive setup message sets up calls in response to it and then transmits call setup message to the destination IP terminals automatically. The detailed description on the above described is followed with reference to FIG. 5.

The call controller 214 in the source IP terminal 22 decides if the call connect message is received from each destination IP terminal in step 422 and performs call setup process with the destination IP terminals in step 424 according to the decision result. The call setup process is typical process connecting to media channels in order that voice data transmission is possible. If the call signaling is successfully completed through the call setup process, the call controller 214 proceeds 426. In the step 426, the call controller 214 shows that the call is successfully set up by setting fields of call result to "1", where the fields of call setup result correspond to the virtual addresses of the destination IP terminals whose call signalings are completed. The call controller 214 updates channel status in the channel usage status table according to the call signaling completion at step 428. That is, the call controller 214 shows that channel status fields are in use by setting them to "1", where the channel status fields correspond to the virtual addresses of the destination IP terminals whose call signaling are successfully completed.

When the updates of management table and call usage status table are completed through the steps 426 to 428, the call controller 214 informs the update results to the media controller 216 in order to achieve multi-calls. Accordingly, the media controller 216 performs the compulsive reception of multi-calls at step 430. Namely, the media controller 216 transfers voice data, received from the destination IP terminals through the network interface portion 218, to the audio codec DSP interface portion 220 without regarding the channel numbers. The voice data, which transferred from the audio codec DSP interface portion 220 to the media controller 216, are transmitted to the destination IP terminals through all of the channels set open, namely "1 " in the channel usage status table. The call controller 214 checks if a multi-call termination request is generated by its user or the users of the destination IP terminals. If any multi-call termination request is detected at step 432, the call controller 214 proceeds to step 434 and updates corresponding channel status fields in the channel usage status table. That is, it updates the values of call status fields corresponding to the virtual addresses of the destination IP terminals to "0" in order for them to be used by the other IP terminals. In addition, the call controller 214 provides information recorded in the management table to the user interface portion 212 in order for the users to confirm the results of the compulsive reception multi-calls.

The actions of the destination IP terminals according to an embodiment of the present invention are described in detail below with reference to control flow shown in FIG. 5.

Figure 5:
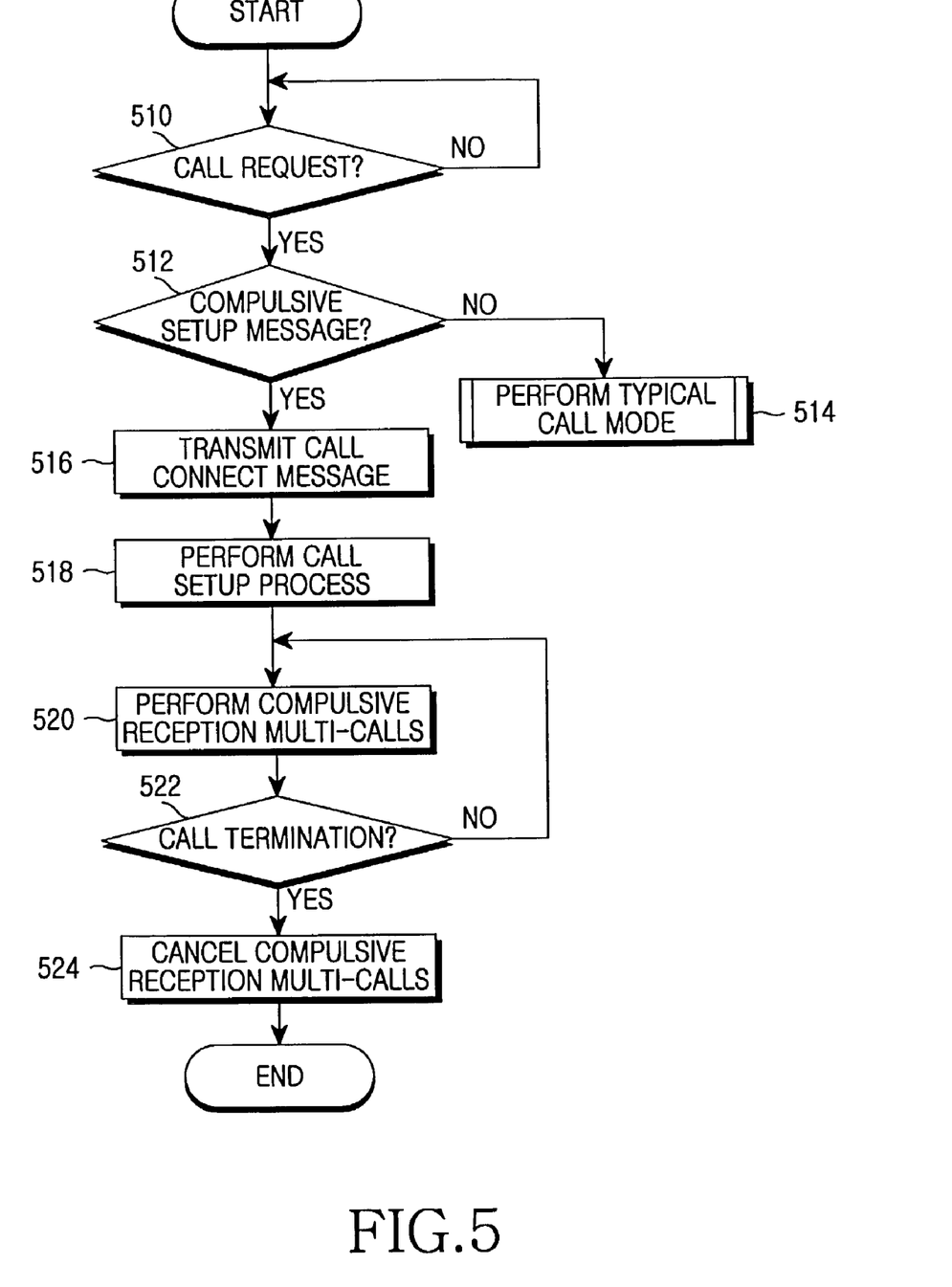
FIG. 5 shows control flow of a destination IP terminal for compulsive reception multi-calls according to an embodiment of the present invention.

Referring to FIG. 5, the destination IP terminals check if any call request is received from the source IP terminal at step 510. If any call request is detected at step 510, the destination IP terminals proceed to step 512 to decide if the call request is the one of the compulsive reception multi-calls. The decision depends on the reception of the compulsive setup message. That is, it depends on that the call request message includes information requesting the compulsive reception multi-calls. For example, it can be known to be the compulsive setup message by checking if the H.323 ID fields include information of the compulsive reception multi-call request, namely_auto call, where the H.323 ID fields of source address structure, one of UUIE fields of the setup message are received at time of call signaling, which is proposed in the H.225.0. If it is decided not to be the compulsive reception multi-call request at step 512, the destination IP terminals proceed to step 514 to perform typical setup mode.

If it is decided to be at step 512, however, the destination IP terminals transmit call connect message to the source IP terminal automatically. The call connect message means admission of the compulsive reception multi-calls. After transmitting the call connect message, the destination IP terminals proceed to step 518 to perform typical call setup process for calls with the source IP terminal. When the compulsive reception multi-call request is received, the destination IP terminals let the call setup process proceed automatically to make the media channels open. The call controllers of the destination IP terminals transfer information on "auto_call: sender's name or number" to the media controller to inform the compulsive reception calls.

If the calls are set up by the call setup process, the destination IP terminals proceed to step 520 to perform the compulsive reception multi-calls. The destination IP terminals check continuously if the compulsive reception multi-calls are terminated at step 522 during the compulsive reception multi-calling. If the compulsive reception multi-calls are terminated in step 522, the destination IP terminals proceed to step 524 to cancel them and terminate all of actions according to the embodiment of the present invention.

In order to realize the compulsive reception multi-calls according to the embodiment, the destination IP terminals should transmit call connect message automatically in response to the compulsive reception multi-call request from the source IP terminal.

The gatekeeper 10 according to the embodiment of the present invention registers and manages IP addresses corresponding to the virtual addresses of the IP terminals according to registration request from the IP terminals. If the gatekeeper 10 receives a request of call signaling with a specific IP terminal from the source IP terminal 22, the gatekeeper 10 is provided an virtual address of the specific IP terminal and provides an IP address corresponding to the virtual address to the source IP terminal.

As described above, the present invention connects the source IP terminal to the destination IP terminals at time of multi-calls, so that it can provides rapid call setup as well as convenience of simplification of manipulation of a user.

What is claimed is:

1. A method for making a compulsive IP call from one source IP terminal to a plurality of destination IP terminals, comprising the steps of:

querying IP addresses corresponding to each virtual address of said destination IP terminals included in a specific group among the plurality of IP terminals, the specific group for compulsive reception multi-calls being designated by a user;

allocating channels connected to the plurality of destination IP terminals corresponding to each IP address, each IP address being provided from a gatekeeper;

transmitting compulsive setup messages through each allocated channel;

transmitting automatically from the destination IP terminals call connect messages in response to the compulsive setup message; and placing the compulsive IP call to each of said plurality of destination IP terminals upon receipt of said call connect messages by said source IP terminal, wherein compulsive reception means regardless of whether or not one of said destination IP terminals responds.

2. The method of claim 1, the gatekeeper manages the allocated channels and results of the compulsive reception multi-calls corresponding to each of said plurality of destination IP terminals by using a channel usage status table and a management table, respectively.

3. The method of claim 2, the gatekeeper resets values of channel status fields, managed by the channel usage status table and corresponding to each destination IP terminal when the compulsive reception multi-calls are terminated.

4. The method of claim 2, the gatekeeper informs call results, managed by the management table and corresponding to each of said plurality of destination IP terminals to the source IP terminal when the compulsive reception multi-calls are terminated.

5. The method of claim 1, the compulsive setup message comprises information indicating reception of said multi-call by said plurality of destination IP terminals.

6. A method for placing an IP multi-call between a source IP terminal and a plurality of destination IP terminals, comprising the steps of:

inputting a group number with a specific code requesting placement of said multi-call from said source IP terminal;

initializing values of call result fields in a management table, where the call result fields correspond to each one of said plurality of destination IP terminals belonging to a specific group designated by said group number;

performing call signaling with a gatekeeper with respect to the plurality of destination IP terminals and acquiring a plurality of IP addresses corresponding to the virtual addresses of each of said destination IP terminals through the call signaling;

allocating a plurality of channels that are not in use, each one of said plurality of channels corresponding to respective ones of said plurality of destination IP terminals;

recording the virtual addresses of each of said plurality of destination IP terminals into a plurality of virtual address fields in a channel usage status table corresponding to each allocated channel;

transmitting a compulsive setup message through each of said plurality of allocated channels;

recording information indicating successful call setup into setup result fields of the management table, and recording information indicating in-use into channel status fields of the channel usage status table when a call connect message is received automatically from each of said plurality of destination IP terminals in response to the compulsive setup message; and placing compulsive reception multi-calls to each of said plurality of destination IP terminals.

7. The method of claim 6, the compulsive setup message comprises information indicating the reception of a compulsive multi-call for each of said plurality of destination IP terminals.

8. The method of claim 6, the gatekeeper resets values of the channel status fields of the channel usage status table when the multi-call is terminated.

9. The method of claim 6, a gatekeeper informs call results managed by the management table to the source IP terminal when the compulsive multi-call is terminated.

10. The method of claim 6, the compulsive setup message comprises information indicating the compulsive reception multi-calls.

11. The method of claim 6, the source IP terminal resets values of channel status fields of the channel usage status table when the compulsive reception multi-calls are terminated.

12. The method of claim 6, the source IP terminal informs setup results managed by the management table to the source IP terminal when the compulsive reception multi-call is terminated.

13. An apparatus for placing a compulsive IP multi-call, comprising:
 a plurality of destination IP terminals receiving the multi-call;
 a source IP terminal placing said multi-call to said plurality of destination IP terminals;
 a gatekeeper connected to said source IP terminal and each of said plurality of destination IP terminals, said gatekeeper controlling the overall operation of said multi-call;
 a channel usage status table allocating channels that are not in use to corresponding ones of said plurality of destination IP terminals, said channel usage status table managing the allocated channels; and
 a management table managing results of the multi-call for each of said plurality of destination IP terminals, said multi-call being a compulsive multi-call where the multi-call goes through whether or not one of said destination IP terminals responds.

14. The apparatus of claim 13, said source IP terminal comprising an input part enabling said source IP terminal to place either a standard VoIP call or a compulsive multi-call by manipulation of buttons on said input part.

15. A method of placing a compulsive IP (Internet Protocol) multi-call from a source IP terminal to a plurality of destination IP terminals, said method comprising:
 inputting a group number in said source IP terminal selecting said plurality of destination IP terminals;
 transmitting a plurality of virtual addresses corresponding to ones of said plurality of destination IP terminals to a gatekeeper from said source IP terminal;
 receiving a plurality of IP addresses corresponding to said plurality of destination IP terminals by said source IP terminal from said gatekeeper;
 transmitting a call setup message from said source IP terminal to said plurality of destination IP terminals;
 receiving a plurality of call connect messages from respective ones of said plurality of destination IP terminals by said source IP terminal; and
 carrying out said compulsive IP multi-call providing compulsive reception regardless of whether or not one of said plurality of destination IP terminals responds.

16. The method of claim 15, said call connect messages being provided by each one of said plurality of destination IP terminals regardless of whether a subscriber of one of said destination IP terminals responds.

17. The method of claim 15, said method being preceded by the step of registering said source IP terminal with said gatekeeper.

* * * * *